Aug. 24, 1937. J. T. ZAK 2,090,658
RANGE FINDING, HORIZONTAL ANGLE MEASURING AND ANGLE OF SITE INSTRUMENT
Original Filed Dec. 11, 1934
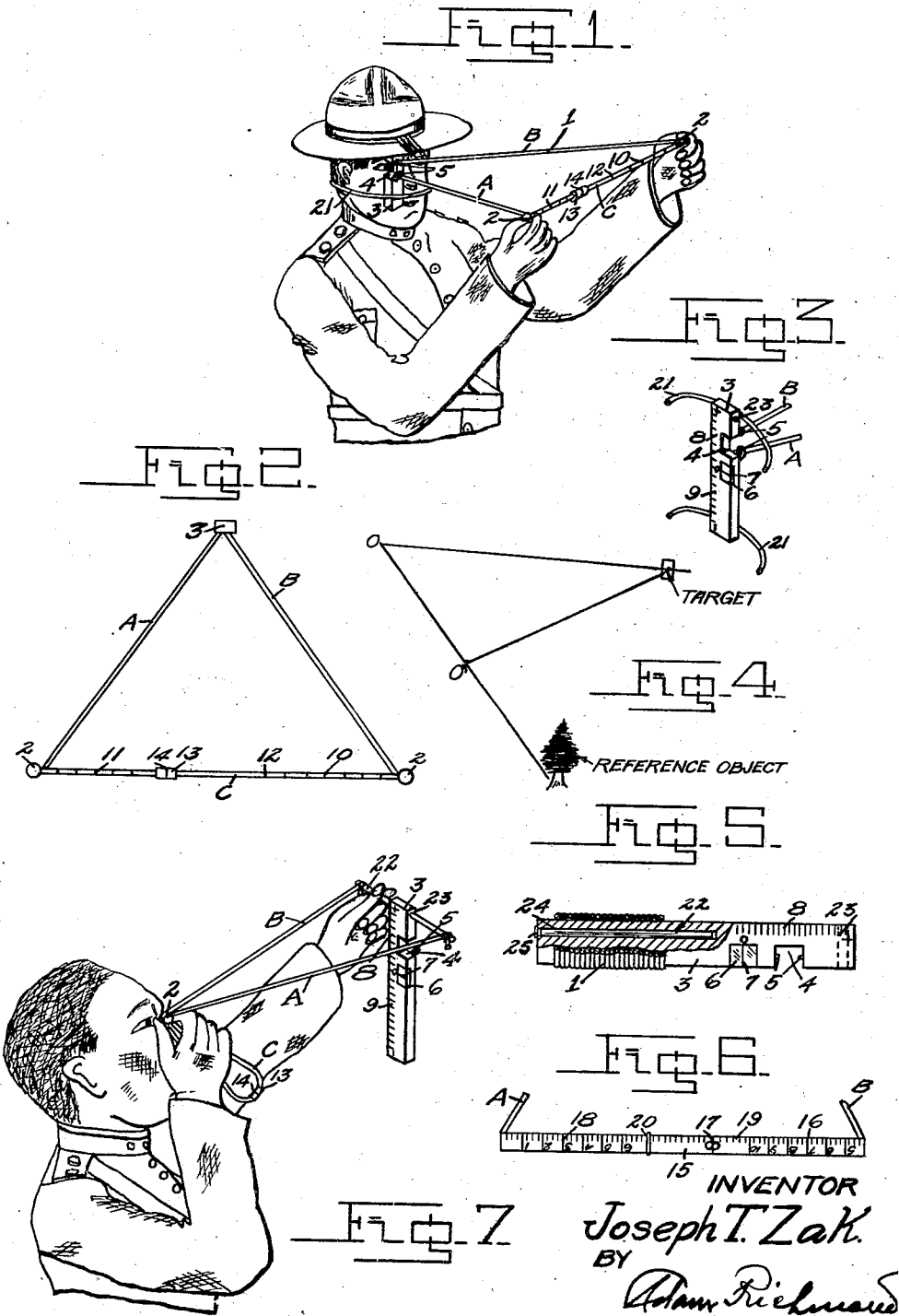
INVENTOR
Joseph T. Zak.
BY
Adam Richmond
ATTORNEY Patented Aug. 24, 1937

2,090,658

UNITED STATES PATENT OFFICE 2,090,658

RANGE FINDING, HORIZONTAL ANGLE MEASURING, AND ANGLE OF SITE INSTRUMENT

Joseph T. Zak, San Francisco, Calif.

Original application December 11, 1934, Serial No. 756,992. Divided and this application July 15, 1936, Serial No. 90,703

4 Claims. (Cl. 33—64)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an improved instrument of the type described and claimed in my pending application Serial No. 756,992, filed December 11, 1934, entitled Range finding, horizontal angle measuring, and angle of site instrument, of which this application is a division; more especially it is directed to a simplified field instrument susceptible of use as a range finding, horizontal angle and angle of site measuring device.

One of the objects of this invention is to provide a simplified form of range finding, horizontal angle measuring and angle of site instrument which may be constructed of any suitable available material such as a string, buttons and a pencil or the like and which is especially adapted to be adjusted easily and quickly to an operative condition for determining accurate data for use in gunnery.

Another object of my invention is to provide a combined range finding, horizontal angle measuring and angle of site instrument in a unitary structure, which is simple in construction, light in weight, efficient in use and which is not liable to get out of order.

Heretofore the instruments used in solving problems in gunnery as compared to my invention were relatively bulky in construction and complicated in operation thereby causing the observer to waste time in moving the instrument to position for operation and adjusting the instrument before it was in condition for operation.

It is therefore the purpose of my invention to provide an instrument which is compact in construction and simple in operation, thereby permitting it to be immediately accessible under the conditions of field service, and quickly adjusted to an operative condition.

With the above and other objects in view the invention consists in features of construction, arrangement and operation of parts which will hereinafter appear. For purposes of illustration the invention will be described and claimed with reference to the accompanying drawing in which like numbers distinguish like parts and in which—

Fig. 1 is a perspective view of my invention showing the manner in which the instrument is used in determining ranges;

Fig. 2 is a top plan view of the instrument;

Fig. 3 is a perspective view of an eyepiece used in carrying out my invention, with parts connected thereto broken away;

Fig. 4 is a diagrammatic view illustrating the manner of solving a range problem with the instrument;

Fig. 5 is an enlarged side view partly in section illustrating the instrument as assembled when not in use;

Fig. 6 is a top plan view of a modified form of side portion of the instrument and Fig. 7 is a perspective view showing the manner in which the instrument is used in determining angles of site.

In the illustrated embodiment characterizing my invention, (1) indicates a flexible member such as a string of predetermined length having holding means (2) in the form of buttons or the like and an eye-piece (3) connected thereto at suitably spaced points thereon, whereby side portions A, B and C are provided on the instrument.

The eye-piece (3) preferably comprises a rigid member, such as a bar which is provided with a peep-slot (4) in its outer edge and having suitable fastening means such as hook like members (5) secured thereto to which the ends of the string (1) are connected detachably when using the instrument for the determination of ranges and horizontal angle measuring.

In order to determine angles of site the eye-piece (3) is provided with a front sight comprising a mirror (6), on which is inscribed a horizontal reference line (7). From adjacent the inner end of the reference line (7) on the other side edge of the eye-piece as zero, a plus mil scale (8) is inscribed on the upper portion of the front sight and a minus mil scale (9) is inscribed on the lower portion.

The section C of the string (1) between the holding means (2) is provided with marks to indicate a range scale (10), a range corrector scale (11) and an infinity mark (12), the values of the range scale (10) and corrector scale (11) being memorized by the observer. Similar marks may also be provided on the section C of the string to indicate a mil scale for measuring horizontal angles using a mark for each 50 mils. A suitable marker (13) such as a lead pencil eraser having a central aiming mark (14) provided thereon, is mounted slidably on the section C of the string.

If desired a rigid member (15) as illustrated in Figure 6 of the drawing, may be substituted for section C of the instrument. Inscribed on one end of the rigid member (15) is a range scale (16), and an infinity mark (17) and on the other end of the rigid member is a range corrector scale (18). A mil scale (19) for measuring horizontal angles using a mark for each 50 mils and a suitable marker (20) such as a rubber band is also provided on the rigid member (15).

In employing the instrument for the determination of ranges the observer secures the eye-piece (3) as illustrated in Figure 1 of the drawing, to his head by elastic straps (21) with the peep-slot (4) provided therein in line with the aiming eye. The observer then holds section C of the instrument outwardly in extended position along the line of vision by means of the members (2) whereby the instrument assumes a substantially equilateral triangular shape when in operative position.

Reference being had to Fig. 4 of the drawing, the observer at 0 extends the device as shown in Fig. 1, and places the infinity mark (12) in line with the target and glancing toward the range corrector scale (11), selects a convenient and distant reference object such as a tree and notes the point on the range corrector scale (11) where the reference object intercepts said range corrector scale. The observer then lowers the device and with the right hand slides the marker (13) so that the aiming mark (14) coincides with the point on range corrector scale (11) at which the reference object was found to intercept said range corrector scale (11). The device is again extended as shown in Fig. 1 so that the infinity mark (12) is in line with the target and glances over aiming line (14) on marker (13) to check up, verify and assure himself that the aiming line 14 is in line with the reference object. At 0' the observer extends the device as in Fig. 1 so that aiming mark (14) of marker (13) is in line with the previously selected reference object (tree) and glances, at the same time, over the range scale (10) to see where the target intercepts the range scale, which is the range as read, to be corrected by the subtraction of the indicated per cent of correction as noted by the position of the marker (13) on the range corrector scale (11).

To determine angles of site of a given object, the eye-piece (3) is removed from the flexible member or string (1) and a cross bar in the form of a pin (22) is fitted in an aperture (23) provided in the upper end of the eye-piece, the ends of the pin extending outwardly an equal distance from the side edges of the eye-piece as illustrated in Fig. 7 of the drawing. The pin (22) provides means for suspending the eye-piece therefrom, the eye-piece being adapted to swing freely on the pin, and also provides means to which the ends of the string (1) may be suitably connected. The observer holds the pin (22) in one hand with the eye-piece extending downwardly therefrom and held in a suspended vertical position by means of gravity, the front sight of the eye-piece facing the observer, he then holds the members (2) together against his aiming eye with his other hand and sights on a target with the section C of the string (1) extending downwardly therefrom. When the reflection of the pupil of the eye in the mirror (6) is on line with the zero line then the observer may readily read the plus or minus angle of site to the target. This angle of site measuring feature of the instrument is substantially the same in principle as disclosed in my prior Patent No. 1,723,456.

In assembling the instrument when not in use the string (1) after having been disconnected from the ends of the pin (22) is wrapped around the eye-piece and the pin is removed from the aperture (23) and inserted in a longitudinal extending slot (24) provided in the lower portion of the eye-piece where it is held in place by means of a suitable catch (25), as illustrated in Fig. 5 of the drawing.

The range scale used on the instrument is based on the following formula:—R M equals 1,000 W, where R is a range, M the angular width in mils of the target or base line and W the lineal width of the target or base line. In the present case the range scale is selected for a base line of 50-yards, where the base line and reference object are at right angles to the observer target line and the portion C of the string is held at a computed distance from the eye of the observer. Inasmuch as the direction of the base line will vary with the position of the reference object (the object which determines the direction of base line) the actual W of the formula will become less as the angle target-observer reference object becomes less and the actual range reading will be correspondingly greater than the correct range reading.

For the sake of accuracy and convenience the normal base line of 50-yards may vary in practice. A 25-yard base line has given an average of 2% error for ranges up to 500 yards, but when using the 25-yard base line the final range finding must be balanced. In extremely long ranges the base line can be doubled for accuracy, hence the final range reading must be doubled to secure correct range. It is possible to accurately take the range to a target several thousand yards distant provided the base line is correspondingly increased.

The above disclosed instrument can be used in a sitting, kneeling, standing or prone position. It has been found in using the instrument that the position for obtaining the greatest steadiness thereof is in the sitting position with the elbows resting on the knees and the breath held as in firing a rifle. When using the instrument in the prone position the observer lies on his back, feet towards the target and head raised above the breast. For measuring the base line a five or ten yard length of any suitable wire, such as picture wire, may be used. A good string gives satisfactory results. Careful pacing of base line eliminates the need of a string.

It will thus be seen that I have provided a highly novel and simple form of a combined range finding, horizontal angle measuring and angle of site instrument, which is well adapted for all the purposes designated. Even though I have herein described my invention as comprising certain details of construction and operation, it is nevertheless to be understood that various changes may be made therein without departing from the spirit or scope of my invention.

Having described my invention, what I claim as new and wish to secure by Letters Patent is:

1. An instrument of the character described, comprising a flexible member and means comprising an eye-piece and holding means connected to said flexible member at regular spaced intervals, there being a range scale, range corrector scale, a scale graduated in mils, an infinity mark, and a movable marker on said flexible member intermediate said holding means.

2. An instrument of the character described, comprising a flexible member of predetermined length, a trio of members connected thereto at equally spaced points thereon, providing side portions, one of said trio of members comprising an eye-piece adapted to be secured to the head of the user of the instrument in front of his aiming eye, and the other of said members providing means for holding one of said side portions in extended position along the line of vision of the observer, there being a range scale, corrector scale, mil scale, an infinity mark and a movable marker on said last mentioned side portion.

3. An instrument of the character described, comprising a flexible member of predetermined length, a trio of members connected thereto, at equally spaced points thereon, two of said trio of members comprising holding means and the other thereof comprising an eye-piece, a range scale, corrector scale, infinity mark, mil rule scale and a movable marker provided on said flexible member intermediate said holding means, said eye-piece comprising a bar containing an eye-slot and means for determining angles of site.

4. An instrument of the character described, comprising a flexible member of predetermined length, a trio of members connected thereto, at suitably spaced points thereon, two of said trio of spaced members comprising holding means and the other thereof comprising an eye-piece, a range scale, range corrector scale, infinity mark, mil rule scale and a movable marker provided on said flexible member intermediate said holding means, said eye-piece comprising a bar containing an eye-slot and means for determining angles of site, said means comprising a plus and minus angle of site scale inscribed on said bar, and a reflecting surface bearing a reference at the zero of said scale.

JOSEPH T. ZAK.